Feb. 4, 1936. A. P. JOHNSON 2,029,871
CINEMATOGRAPH APPARATUS
Filed Nov. 8, 1934 2 Sheets-Sheet 1
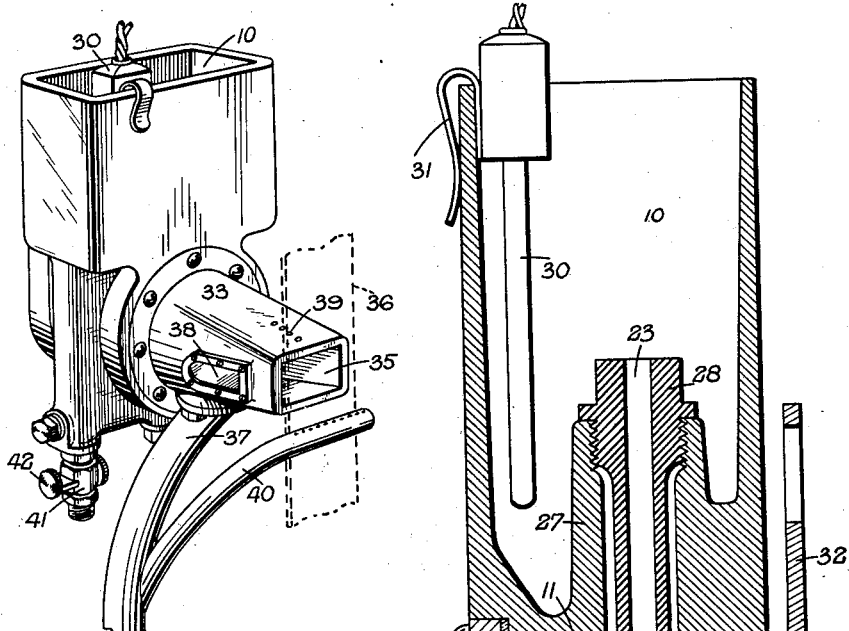
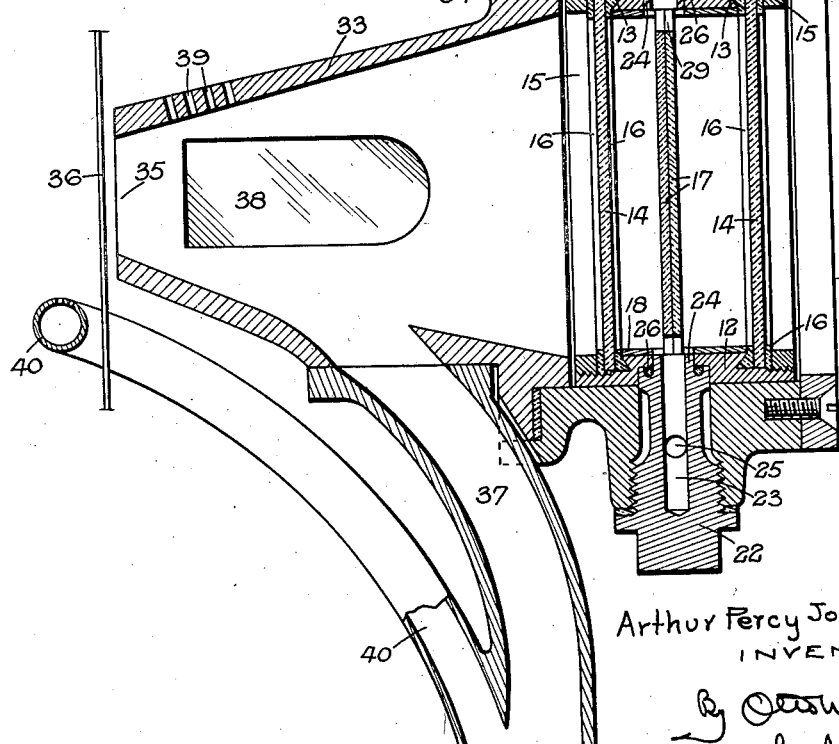
Arthur Percy Johnson
INVENTOR
his ATTY.

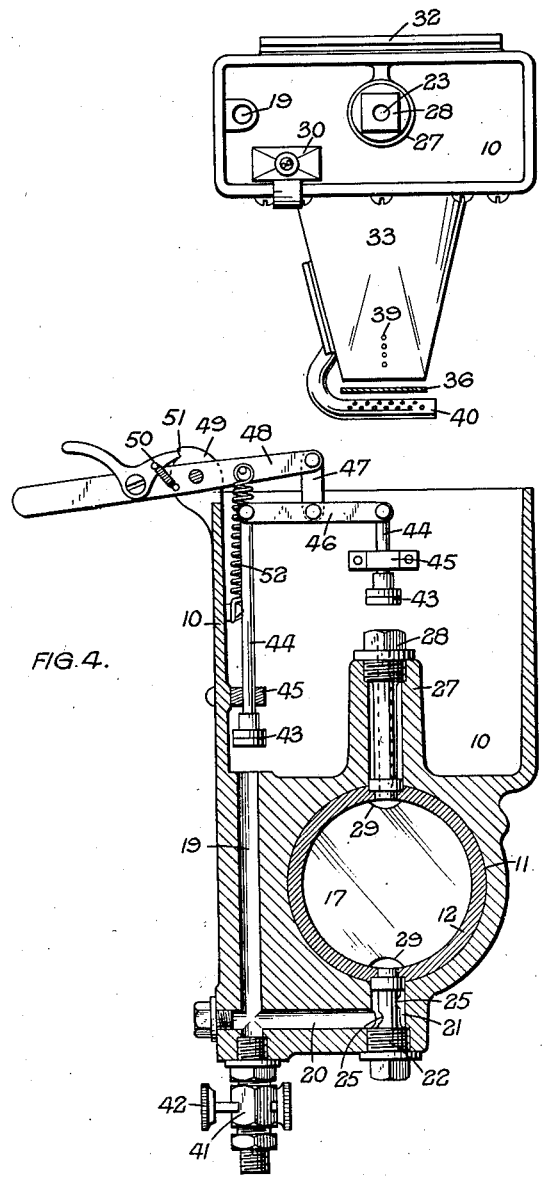

Patented Feb. 4, 1936

2,029,871

UNITED STATES PATENT OFFICE 2,029,871

CINEMATOGRAPH APPARATUS

Arthur Percy Johnson, Wylde Green, Birmingham, England

Application November 8, 1934, Serial No. 751,978
In Great Britain November 11, 1933

13 Claims. (Cl. 88—24)

This invention relates to cinematograph apparatus including a chamber containing liquid adapted to be disposed between the projection light and the film, means being provided for heating the liquid to maintain it at a temperature sufficient to eliminate condensation upon the transparent sides of the chamber.

The object of the present invention is to provide an improved or modified construction of such apparatus which will provide improved cooling of the projection beam and will minimize or prevent the possibility of the film being damaged by exposure to the heating effect of the projection beam.

Referring to the drawings:—

Figure 1 is a perspective view of one form of apparatus constructed according to the present invention.

Figure 2 is a sectional side elevation of same.

Figure 3 is a a plan view of same.

Figure 4 is a sectional end elevation of same with a slight modification applied.

In the construction illustrated in the accompanying drawings, the main structure of the unit comprises a single casting formed at its upper part into an open ended tank 10, beneath which is disposed a cylindrical passage 11 which extends through the casting from side to side.

Within the passage is mounted a liquid chamber comprising a cylindrical sleeve 12 formed at each end with an integral shoulder 13 against which a transparent glass window 14 is clamped by means of a screwed ring 15, packing washers 16 being provided in each side of each glass to form a liquid tight joint.

A filter or screen is mounted in the chamber between the windows 14, this filter or screen comprising two glasses 17 clamped between sleeves 18 inserted within the chamber 12 and clamped in position by the rings 15.

The windows 14 are formed from heat resisting glass and may be tinted, for example green. The glasses 17 may also be coloured and one may be of green glass and the other of pink glass.

The tank 10 is adapted to form a reserve tank for cooling liquid with which the chamber 12 is to be filled and communicating passages are provided between the tank and the chamber.

A vertical passage 19 is formed through the casting from the base of the tank 10, this passage communicating with a horizontal passage 20 extending into a further short vertical passage 21 disposed beneath the chamber 12 as shown in Figure 4.

The passage 21 is screw-threaded at its lower end and a union nipple 22 is screwed into this passage to close the lower end thereof.

This nipple is formed with a tubular shank 23 at its upper end and a portion 24 of reduced diameter extends through a hole in the lower side of the chamber 12.

Radial holes 25 are formed in the shank 23 to complete the communication between the passage 20 and the interior of the chamber 12 and a liquid tight joint is provided between the nipple and the chamber by means of a packing washer 26 disposed around the reduced end 24.

The casting is formed with an integral hollow boss 27 which projects upwardly from the base of the tank 10 and in this boss is disposed a further nipple 28 which screws into a screw-thread in the upper portion of the bore through the boss 27.

The nipple 28 is similar to the nipple 22 previously described and a reduced end 24 extends through a hole in the chamber 12, the joint being sealed by a ring 26, but a passage extends entirely through the nipple 28 so that the liquid can flow from the upper part of the chamber 12 into the reserve tank 10.

The cooling liquid can thus circulate between the tank 10 and the chamber 12 and as heated liquid passes from the top of the chamber through the nipple 28, cool liquid flows from the tank 10 through the passages 19 and 20 and enters the lower part of the chamber 12 through the nipple 22.

The glasses 17 are disposed in alignment with the nipples 22 and 28 so that the cooling liquid is directed over both sides of the filter or screen and the possibility of unequal heating of the two faces is minimized. The glasses 17 are recessed or cut away at points opposite to the positions of the nipples, as shown at 29 in Figure 4, so that the liquid can flow readily between the chamber and the nipples.

In order to raise the temperature of the liquid initially and to maintain a temperature sufficient to eliminate condensation on the transparent sides of the chamber 12, an immersion heater 30 is mounted in the reserve tank and is located in position by a spring clip 31 engaging over the upper edge of the tank.

To one side of the casting is attached a flange 32 by means of which the apparatus may be secured to the lamp house and whilst this flange is formed with a central aperture to allow the light to pass through the transparent sides 14, the opening is of less area than that of the section of the passage 11, so that the flange overlaps the end of this passage and forms a stop shoulder.

To the opposite side of the casting is attached a conical or converging hood 33 provided with an attachment flange and spigot 34 which enters the end of the passage 11 as shown in Figure 2, whilst at its projecting end the hood is formed with an aperture or gate 35 across which the film, as shown at 36, is passed when the apparatus is in use.

To the underside of the hood is secured an air conduit or duct 37, and an air blast from a suitable blower or the like is directed along this conduit or duct into the hood and through the gate or aperture 35 on to the surface of the film.

A side window 38 is provided in the side of the hood to enable the operator to focus the light on to the film being projected and a red or other suitably coloured glass may be provided in this window.

In the top of the hood louvres or exhaust holes 39 are provided so that the air can escape from the hood and to avoid trapping of warm air in the upper portion of the hood.

A branch pipe 40 extends from the conduit 37 around the side of the film and this pipe is perforated so that cooling air can be directed on to the front face of the film being projected.

In order to prevent or minimize possible damage to the projection apparatus due to leakage of the liquid by fracture of one of the glasses 14, a valve 41 is mounted in the lower end of the passage 19 so that the liquid can readily be drained away.

This valve is provided with an apertured closure slide 42 and if one of the glasses 14 cracks or it is desired to empty the chamber 12 for any other reason, the cooling liquid can be drained into a suitable container by moving the closure slide 42 into the open position.

With this construction the light from the projection lamp passes through the liquid cell comprising the glasses 14, the glasses 17, and the cooling liquid in the chamber 12 and the combined effect of this cell removes from the projection beam the heat rays which would be liable to damage the film.

With projection apparatus working at higher temperatures in order to obtain increased light intensity in the beam, there is a considerable amount of heat in the beam particularly when the beam is produced by an arc between metal coated electrodes and unless this heat is removed there is considerable danger of the film being damaged. In addition, under certain circumstances the feed of film through the apparatus is stopped and unless the beam is interrupted or a gate inserted in front of the film, a single portion of the film is exposed continuously to the projection beam for a period dependent upon the time of stoppage.

If exposed to the full heat of the beam there would be greater danger of this small piece of film being permanently damaged or even heated to firing point, in which case the whole film and possibly the apparatus itself would be endangered.

The cooling cell above described removes this dangerous heat before the light reaches the film which can thus be exposed continuously without danger for sufficient time to allow the cause of the stoppage to be removed or corrected.

In addition the cooling air blast directed on to both sides or faces of the film further reduces the danger of over-heating of the part exposed to the projection beam so that the possibility of fire due to over-heating of the film is eliminated or substantially reduced.

In addition air is directed on the adjacent portions of the apparatus which are exposed to the heating effects of the beam such for example as the projector back plate across which the film passes in use. Such parts are consequently cooled and distortion due to over-heating is reduced or eliminated with a consequent increase in the life and efficiency of operation of the apparatus.

As the liquid in the chamber 12 becomes heated by the projection beam a thermal siphon circulation is set up between the chamber and the reserve tank, heated liquid flowing from the top of the chamber up the nipple 28 and further liquid flowing from the tank into the lower part of the chamber through the passages 19 and 20 and the nipple 22.

Where it is desired to remove the chamber 12, either the flange 32 or the hood 33 is detached from the casting and when the unit is secured to the back of the lamp house by means of the flange 32, it is preferable to remove the hood 33. The nipples 22 and 28 are then screwed out until the ends 24 are withdrawn from the openings in the chamber, after which the latter can be slidden out of the passage 11.

In the construction described, it would, of course, be necessary to drain the liquid both from the chamber and from the tank 10 but with the modification illustrated in Figure 4, draining of the tank 10 is avoided, valves being provided to cut off the communication between the tank 10 and the chamber 12, and it is only necessary to drain the latter and the reserve of liquid may be retained in the tank 10.

A valve 43 is provided at the upper end of the nipple 28 with a further valve 43 at the upper end of the passage 19, each valve being mounted on a valve rod 44 guided in a bracket 45 on the interior of the tank 10. The two rods 44 are coupled by a link 46 which is connected by a further link 47 to one end of an operating lever 48 pivoted between brackets 49 at the top edge of the tank 10.

To the projecting end of the lever 48 is pivoted a spring pressed catch 50 adapted to engage a lug 51 on the bracket 49 to retain the valves 43 in the open position against the action of the spring 52.

In normal use the apparatus is in the position shown in Figure 4 so that communication is established between the tank 10 and the chamber 12 but this communication can be cut off by releasing the catch 50 and allowing the valves 43 to close under the effect of the spring 52.

Thus, in the event of fracture of the glasses 14, the liquid in the tank 10 can be shut off from communication with the chamber 12, which latter can be drained of liquid by means of the valve 41 and the chamber 12 can readily be refilled for use when the failure has been repaired.

What I claim then is:—

1. A cooling unit for use with cinematograph apparatus including a body having in its upper part a reserve tank and in its lower part a chamber, a transparent panel in each of two opposite sides of said chamber, liquid circulating passages between said tank and said chamber, cooling liquid in said tank and said chamber, said chamber being adapted to be arranged with said transparent panels interposed in the light beam for projecting a film, a hood attached to said body at one side of said chamber, an air supply conduit communicating with said hood, and means located in said tank for heating the liquid to a temperature sufficient to eliminate condensation on the transparent panels of said chamber.

2. A cooling unit for use with cinematograph projection apparatus including a body having in its upper part a reserve tank and in its lower part a chamber, a transparent panel in each of two opposite sides of said chamber, cooling liquid in said tank and said chamber, liquid circulating passages between said tank and said chamber, a hood attached to said body at one side of said chamber, said hood having an opening in its projecting end, an air supply conduit communicating with said hood for directing air on one face of a film passing said opening, a further air supply conduit for directing air on the other face of said film and a heating element in said tank for heating the liquid to a temperature sufficient to eliminate condensation on the transparent panels of said chamber.

3. A cooling unit for use in cinematograph apparatus including a body having in its upper part a reserve tank and in its lower part an open ended passage, a cylindrical chamber in said passage, a transparent panel at each end of said chamber, liquid circulating passages between said tank and said chamber, cooling liquid in said tank and said chamber, said chamber being adapted to be arranged with said transparent panels interposed in the light beam for projecting a film, a transparent screen in said chamber between said transparent panels and an air supply conduit at one side of said chamber.

4. A cooling unit for use in cinematograph apparatus including a body having in its upper part a reserve tank and in its lower part an open ended passage, a cylindrical chamber in said passage, a transparent panel at each end of said chamber, a heat screen in said chamber between said transparent panels, said screen comprising a pair of glass plates mounted face to face, cooling liquid in said tank and said chamber, liquid circulating passages between said tank and said chamber, said passages communicating with said chamber at the position at which said heat screen is mounted so that liquid is circulated over both faces of said screen, said chamber being adapted to be arranged with said transparent panels interposed in the light beam for projecting a film and an air supply conduit at one side of said chamber.

5. A cooling unit for use in cinematograph apparatus including a body having in its upper part a reserve tank and in its lower part an open ended passage, a cylindrical chamber in said passage, a transparent panel at each end of said chamber, a heat screen in said chamber between said transparent panels, said screen comprising a pair of glass plates mounted face to face, cooling liquid in said tank and said chamber, a tubular nipple in said body communicating with the lower part of said chamber, liquid circulating passages in said body connecting said nipple to said tank, a further tubular nipple in said body connecting the upper part of said chamber to said tank, said nipples communicating with said chamber at the position at which said plates are mounted so that liquid is circulated over both faces of said plates, said chamber being adapted to be arranged with said transparent panels interposed in the light beam for projecting a film and an air supply conduit at one side of said chamber.

6. A cooling unit for use in cinematograph apparatus including a body having in its upper part a reserve tank and in its lower part an open ended passage, a cylindrical chamber in said passage, a transparent panel at each end of said chamber, a heat screen in said chamber between said transparent panels, said screen comprising a pair of glass plates mounted face to face, cooling liquid in said tank and said chamber, a tubular nipple in said body communicating with the lower part of said chamber, liquid circulating passages in said body connecting said nipple to said tank, a further tubular nipple in said body connecting the upper part of said chamber to said tank, said nipples communicating with said chamber at the position at which said plates are mounted so that liquid is circulated over both faces of said plates, a hood attached to said body at one side of said chamber, said hood having an opening in its projecting end, said opening forming a gate across which a film to be projected is adapted to be moved, an air supply conduit communicating with said hood and a further air supply conduit disposed externally of said hood near opening, so that air can be directed on both faces of a film passed between said further air conduit and said opening.

7. A cooling unit for use with cinematograph projection apparatus including a body having in its upper part a reserve tank and in its lower part a chamber, a transparent panel in each of two opposite sides of said chamber, said chamber being adapted to be arranged with said transparent panels interposed in the projection beam plates of heat resisting glass mounted face to face in said chamber between said transparent panels, cooling liquid in said tank and said chamber, said body having a passage connecting the lower part of said chamber to said tank, and a further passage connecting the upper part of said chamber to said tank, said passages communicating with said chamber at the position occupied by said transparent plates so that liquid is circulated over both faces of said condenser, valve means for cutting off the flow through said passages, a hood attached to said body at one side of said chamber, said hood having an opening in its projecting end, said opening forming a gate across which a film to be projected is adapted to be moved, an air supply conduit communicating with said hood for directing air on said gate, and a heating element in said tank for heating the liquid to a temperature sufficient to eliminate condensation on the transparent panels of said chamber.

8. A cooling unit for use with cinematograph projection apparatus including a body having a reserve tank, a chamber, a transparent panel in each of two opposite sides of said chamber, said chamber being adapted to be arranged with said transparent panels interposed in the projection beam, a heat screen in said chamber between said transparent panels, said screen comprising a pair of glass plates mounted face to face, cooling liquid in said tank and said chamber, said body having a passage connecting the lower part of said chamber to said tank, a further passage connecting the upper part of said chamber to said tank, valve means for cutting off the flow through said passages, a valve for draining the liquid from said chamber, a hood attached to said body at one side of said chamber, said hood having an opening in its projecting end, said opening forming a gate across which a film to be projected is adapted to be moved and through which the light beam is directed, an air supply conduit communicating with said hood, a further air supply conduit disposed externally of said hood near said opening, so that air can be directed on both faces of a film passed between said further air conduit and said opening and an immersion heating element in said tank for heating the liquid to a temperature sufficient to eliminate condensation on the transparent panels of said chamber.

9. A cooling unit for use with cinematograph projection apparatus including a body having in its upper part a reserve tank and in its lower part an open ended passage, a cylindrical chamber in said passage, a transparent panel at each end of said chamber, a heat screen in said chamber between said transparent panels, said screen comprising a plurality of plates of tinted glass, cooling liquid in said tank and said chamber, said body having a passage connecting the lower part of said chamber to said tank, a further passage connecting the upper part of said chamber to said tank, said passages communicating with said chamber at the position occupied by said screen so that liquid is circulated over both faces of said plates, valve means for cutting off the flow through said passages, a valve for draining the liquid from said chamber, said chamber being adapted to be arranged with said transparent panels interposed in the projection beam, a hood attached to said body at one side of said chamber, said hood having an opening in its projecting end, said opening forming a gate across which a film to be projected is adapted to be moved and through which the light beam is directed, an air supply conduit communicating with said hood, and a further air supply conduit disposed externally of said hood and adapted to direct air on the opposite face of the film to that exposed at said opening.

10. Cinematograph projection apparatus including a body having in its upper part a reserve tank and in its lower part a chamber, cooling liquid in said tank and said chamber, a transparent panel in each of two opposite sides of said chamber, said chamber being disposed with transparent panels interposed in the light beam for projecting a film, transparent glasses arranged face to face in said chamber between said transparent panels, means for clamping said glasses in position in said chamber, said chamber having in its wall an upper and a lower opening at the position at which said glasses are clamped, tubular nipples in said body projecting one into each of said openings in the chamber, sealing means between said nipples and said chamber and liquid passages connecting said nipples to said tank.

11. Cinematograph projection apparatus including a body having in its upper part a reserve tank and in its lower part an open ended passage, a cylindrical chamber in said passage, cooling liquid in said tank and said chamber, a transparent panel at each end of said chamber, said chamber being disposed with said transparent panels interposed in the light beam for projecting a film, a pair of glass discs arranged face to face in said chamber between said transparent panels, clamping sleeves in said chamber securing said discs in position, said chamber having in its wall an upper and a lower opening at the position at which said glasses are clamped, a tubular nipple in said body, said nipple opening into said tank and projecting into the upper opening in said chamber, a lower nipple in said body projecting into the lower opening in said chamber, said body having liquid passages connecting said lower nipple with said tank, and sealing means between said nipples and said chamber.

12. A cooling unit for use with cinematograph apparatus including a body having in its upper part a reserve tank and in its lower part a chamber, cooling liquid in said tank and said chamber, a transparent panel in each of two opposite sides of said chamber, said chamber being adapted to be arranged with said transparent panels interposed in the light beam for projecting a film, transparent glasses arranged face to face in said chamber between said transparent panels, means for clamping said glasses in position in said chamber, said chamber having in its wall an upper and a lower opening at the position at which said glasses are clamped, tubular nipples in said body projecting one into each of said openings in the chamber, sealing means between said nipples and said chamber and liquid passages connecting said nipples to said tank.

13. A cooling unit for use with cinematograph projection apparatus including a body having in its upper part a reserve tank and in its lower part an open ended passage, a cylindrical chamber in said passage, cooling liquid in said tank and said chamber, a transparent panel at each end of said chamber, said chamber being adapted to be arranged with said transparent panels interposed in the light beam for projecting a film, a pair of glass discs arranged face to face in said chamber between said transparent panels, clamping sleeves in said chamber securing said discs in position, said chamber having in its wall an upper and a lower opening at the position at which said glasses are clamped, a tubular nipple in said body, said nipple opening into said tank and projecting into the upper opening in said chamber, a lower nipple in said body projecting into the lower opening in said chamber, said body having liquid passages connecting said lower nipple with said tank, and sealing means between said nipples and said chamber.

ARTHUR PERCY JOHNSON.